United States Patent [19]

Jürgen

[11] Patent Number: 4,634,847
[45] Date of Patent: Jan. 6, 1987

[54] CAPACITIVE DATA CARRIER READER

[76] Inventor: Machate Jürgen, Münchner Strasse 17c, 8017 Ebersberg, Fed. Rep. of Germany

[21] Appl. No.: 704,636

[22] Filed: Feb. 22, 1985

[30] Foreign Application Priority Data

Feb. 25, 1984 [DE] Fed. Rep. of Germany ....... 3411240

[51] Int. Cl.⁴ .............................................. G06K 7/08
[52] U.S. Cl. ................................... 235/451; 235/487
[58] Field of Search .................. 235/451, 487; 382/11

[56] References Cited

U.S. PATENT DOCUMENTS 4,335,056 10/1982 Tsikos ............................... 382/11 X Primary Examiner—Harold I. Pitts
Attorney, Agent, or Firm—Handal & Morofsky

[57] ABSTRACT

A capacitive data carrier reader is provided and a data carrier therefor. The reader operates with a capacitive bridge circuit. The data carrier is robust, proof against forgery and falsification, and cheap to produce.

6 Claims, 5 Drawing Figures

CAPACITIVE DATA CARRIER READER

BACKGROUND OF THE INVENTION

The invention relates to a device for capacitive reading of data carriers, such as labels, which comprise a substrate of non-conductive material which carries at predetermined marking locations special markings in conductive material which can be formed for example by printing on conductive ink or applying metal foil. Such devices are known from No. DE-C-28 17 388.

The electronic data techniques which are establishing themselves in all areas of industry require new methods and means for automatic identification of articles. The optically readable bar code labels as used in department stores are an example. In production lines automatically readable codes are required to enable the material flow to be controlled. For identification of railway carriages a system exists operating with resonance circuits in the microwave range. If it is required to detect whether an article is genuine machine-readable labels are required whose information must be difficult to interpret without such aids and proof against forgery. For identifying articles exposed to rough ambient conditions the label must be very robust. For mass-produced articles particular demands are made of the simple and economic production of the labels.

The known labels and the associated readers or scanners inadequately meet or completely fail to meet the requirements as regards robustness, proof against forgery and economic production.

Admittedly, in the case of bar code scanners the labels are cheap to make but the information is visible and can therefore be falsified; moreover, soiling leads to reading errors. Other reading devices, such as microwave resonance circuits, are too complicated. The latter also applies to data carriers consisting of variable permanent magnets.

SUMMARY OF THE INVENTION

The problem underlying the invention is to provide a device for capacitive scanning of data characters of the aforementioned type which even on approach of the data carrier reads out the information contained therein but nevertheless operates trouble-free, and with which it is admissible to arrange the data carrier on a conductive support. Furthermore, the invention is intended to provide data carriers such as labels which meet the above requirements.

A preferred embodiment of a data carrier according to the invention is a label carrying markings and comprising a substrate of non-conductive material, such as paper or plastic, to which have been applied at predetermined marking locations special markings corresponding to the desired information content or code. The application of the conductive markings can be by imprinting of conductive ink or application of very thin conductivefoils. The number of marking locations adjacent each other and/or arranged above each other may correspond to the number of read positions in the associated reading apparatus (reader). The reader detects the information as binary value. A mark present corresponds for example to the binary value 1 and conversely a missing mark corresponds to the binary value 0. For protection and/or making them unrecognizable the markings may be covered by a non-conductive layer, for example of plastic or paper. This covering layer can be provided with an optically readable imprint of non-conductive ink. The labels are applied with their backs to an article to be identified, preferably by sticking. Since many articles consist of conductive material the latter must not lead to reading errors; also, the approximation of larger conductive surfaces to the reader must not result in any erroneous readings.

Usually, the desired information is applied by a conductive imprint to the corresponding marking positions. It is however possible to provide all the marking locations with sub-area elements which are connected together and the connection of which is severed or retained depending on the desired information. In this manner it is possible to print large numbers of identical labels and to program them later as required.

BRIEF DESCRIPTION OF THE DRAWINGS

The invention will be explained in detail with the aid of examples of embodiment illustrated in the drawings, wherein.

DETAILED DESCRIPTION

Figure 1:
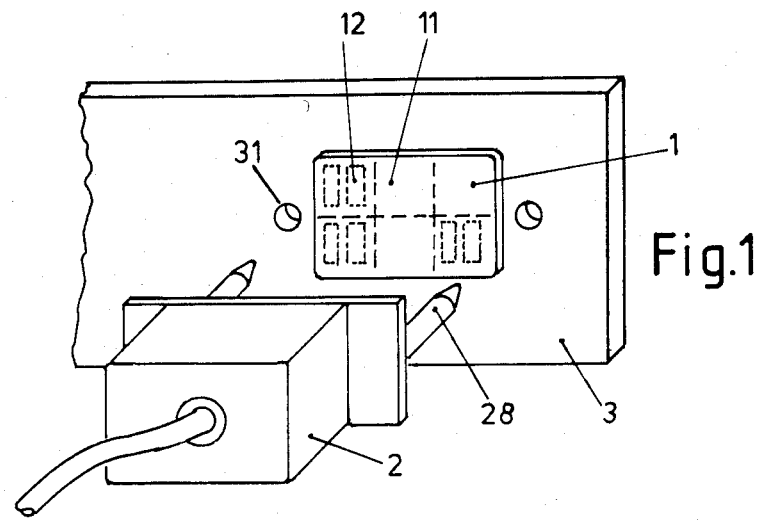
FIG. 1 is a perspective view of a label applied to an article to be identified and part of an associated reading apparatus.

FIG. 1 shows a data carrier according to the invention in the form of a label 1 secured to an article 3 to be identified. The reading is effected after adequate proximation of a reading head 2 of a reader to the label 1, the reading head being positioned in the lateral direction by pins 28 projecting from said head and engaging in bores 31 of the article 3.

The label illustrated has six marking locations 11 of which three are provided with marks 12 which each consist of two adjacent electrically conductive sub-areas. The markings are covered by a covering layer.

Figure 2:
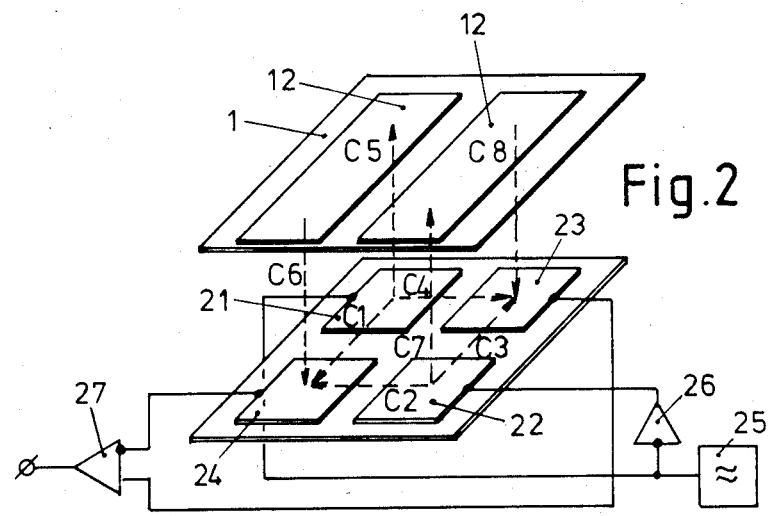
FIG. 2 is a circuit diagram of part of a reader.

The structure and mode of operation of the reader will be explained hereinafter with reference to a single marking location as shown in FIG. 2. The reader contains an oscillator arrangement comprising an oscillator 25 and an inverter 26 which generates a signal opposite in phase to the oscillator signal. These two signals in phase opposition are supplied from the output terminals of the oscillator arrangement to rectangular transmitting faces 21 and 22 diametrically opposite each other on a sensor or reading face of the reading head. Also arranged on the reading face are two likewise diametrically opposite rectangular receiving surfaces 23 and 24 which are connected to the inputs of a differential amplifier 27.

The label 1 has a substrate of non-conductive material such as paper or plastic and carries at the marking location considered a mark comprising two conductive sub-areas 12 which during reading are positioned such that they are located substantially over one of the transmitting faces and one of the receiving faces at the same distance from said faces. In the inoperative condition of the reader, i.e. when the label is not present or is very remote, capacitive couplings occur solely between the transmitting faces 21, 22 and the receiving faces 23, 24. The arrangement is symetrical and therefore the coupling capacitances C1 to C4 are of equal magnitude. Since the two transmission signals have the same amplitude but are in phase opposition at the inputs of the differential amplifier 27 connected to the receiving faces at the most only a very small alternating voltage arises. Only when an effective marking comprising two electrically separate sub-areas 12 approaches is the bridge arrangement formed by the capacitances brought out of equilibrium due to a series connection of "couple-out capacitances" C5 and C7 with "couple-in capacitances" C6 and C8 and as a result relatively great alternating voltages in phase opposition arise at the inputs of the differential amplifier 27. These input voltages of high amplitude generate an output signal of high amplitude at the output of the differential amplifier 27. A following evaluation circuit, in particular a threshold circuit, evaluates the amplitude height of the output voltage.

The outputs of the differential amplifiers which are associated with the various mark locations may for example be connected to a conventional decoding circuit.

Figure 3:
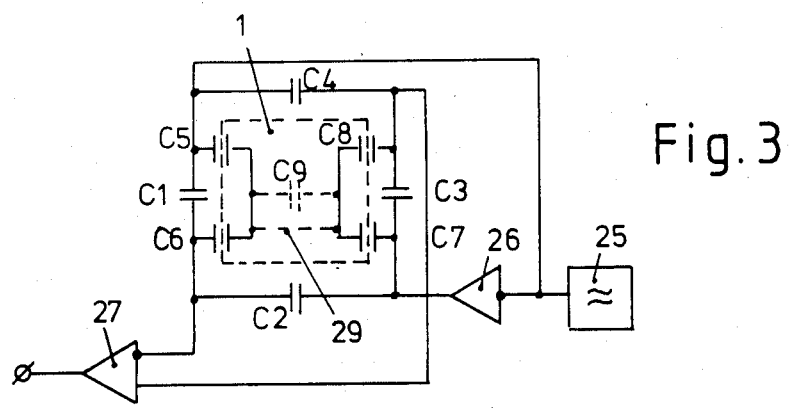
FIG. 3 is an equivalent circuit diagram for FIG. 2.

FIG. 3 shows the electrical equivalent circuit diagram of the reading apparatus and the marking. Without marking the capacitances C5 ... C8 are not present; the capacitances C1 ... C4 between the transmission and receiving faces form a balanced bridge circuit. The approach of a marking of the label produces the additional capacitive couplings via C5+C6 and C7+C8 parallel to C1 and C3 respectively and thus a considerable unbalance of the bridge circuit.

Figure 4:
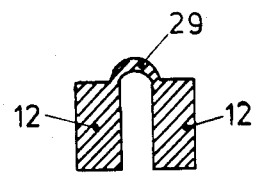
FIG. 4 is an example of a programmable marking.

A special embodiment of a marking for a data carrier according to the invention is shown in FIG. 4. The two sub-areas 12 of the marking are connected electrically together in this case by a thin conductive web. It is apparent from FIG. 3 that the bridge 29 remains balanced as long as C5 and C6 and C7 and C8 respectively have the same capacitance values, which is the case with adequate accuracy when the transmitting and receiving faces or electrodes are arranged in the described manner according to the invention and the two sub-areas 12 of the marking are electrically connected together and so shaped and oriented that the bridge remains balanced, as described above. The marking according to FIG. 4 makes it possible to provide all mark locations with markings of sub-area pairs, connected electrically in each case by a web 29. The data carrier can then later be programmed as desired by severing or retaining predetermined webs.

Figure 5:
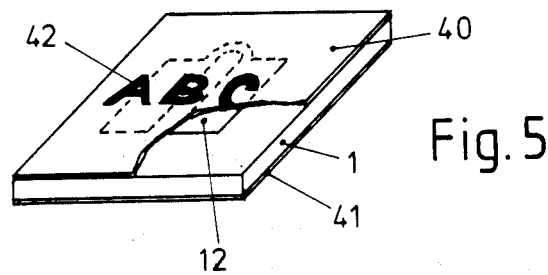
FIG. 5 shows part of a label according to an embodiment of the invention.

FIG. 5 shows part of a data carrier with electrical shielding from outside fields. On the top of the substrate of the part of the label 1 shown a marking comprising halves or sub-areas 12 is imprinted which is protected and made invisible by a non-conductive covering layer 40. The covering layer 40 is imprinted with optically readable information 42. On the lower side the label comprises a conductive layer 41 which can be made by printing or laminating on a conductive foil. The layer 41 acts as capacitance C9 as illustrated in FIG. 3. As long as C5 and C6 and C7 and C8 respectively are of equal magnitude the bridge remains in equilibrium in this case as well. This insures that the function of the label is not impaired even when the article 3 to be identified and provided with the label has an electrically conductive surface.

What is claimed is:

1. Device for capacitive reading of data carriers comprising a substrate of non-conductive material which carries a marking of conductive material at at least one of a plurality of predetermined mark locations, comprising an alternating voltage generating means (25, 26) which has two outputs for two transmission alternating voltage of the same amplitude in phase opposition, characterized in that for each mark location of the data carrier there are provided:
 (a) a pair of electrically conductive transmitting faces (21, 22) which are arranged in a plane adjacent each other and are each coupled to one of the transmission alternating voltage outputs,
 (b) a pair of receiving faces (23, 24) which are arranged symetrically with respect to the transmitting faces (21, 22) in such a manner that the transmission alternating voltages in phase opposition supplied to the transmitting faces generates substantially no voltage between the receiving surfaces when no effective data carrier marking is in the vicinity of said faces (21–24), and
 (c) a differential amplifier which comprises two inputs which are connected to the receiving faces (23, 24) and an output to which a load means is connected.

2. Device according to claim 1, characterized in that the two transmitting faces (21, 22) form with the receiving faces (23, 24) diametrically offset by about 90° with respect to them coupling capacitance (C1 ... C4) of equal magnitude, the transmitting faces (21, 22) forming with the receiving faces (23, 24) a balanced bridge so that when the data carrier is remote at the inputs of the differential amplifier (27) connected to the receiving faces due to the balanced bridge circuit practically no alternating voltages arise and that on close enough approach of a marking comprising two conductive sub-areas (12) on the non-conductive substrate additional couple-out capacitances (C5, C7) are formed which with additional couple-in capacitances (C6, C8) considerably unbalance the bridge circuit, adequately large alternating voltages which can be further evaluated thereby being generated at the inputs of the differential amplifier.

3. Data carrier according to claim 1, characterized in that each effective marking comprises at least one conductive element (12) which on close enough approach to the plane containing transmitting and receiving faces capacitively couples one of the transmitting faces (21 or 22) with one of the receiving faces (23, 24).

4. Data carrier according to claim 3, characterized in that each marking of the data carrier (1) comprises at least one pair of conductive faces (12) which are disposed on the substrate and the width of which is substantially equal to the width of the transmitting face (21 or 22) and the length of which is substantially equal to twice the width of the transmitting faces.

5. Data carrier according to claim 4, characterized in that the two faces (12) of a marking are connected together by a conductive web (29) which can be interrupted to change the data value of the marking containing the two faces.

6. Data carrier according to claim 3, characterized in that the data carrier comprises a continuous shield layer of conductive material on the side of the substrate opposite the markings.

* * * * *